United States Patent
Graus

(10) Patent No.: US 6,581,490 B1
(45) Date of Patent: Jun. 24, 2003

(54) GEARSHIFT LEVER UNIT

(75) Inventor: Xavier Motger Graus, Barcelona (ES)

(73) Assignee: FICO Triad, Rubi (ES)

( * ) Notice: Subject to any disclaimer, the term of this patent is extended or adjusted under 35 U.S.C. 154(b) by 0 days.

(21) Appl. No.: 09/673,535

(22) PCT Filed: Apr. 19, 1999

(86) PCT No.: PCT/EP99/02631
§ 371 (c)(1),
(2), (4) Date: Dec. 4, 2000

(87) PCT Pub. No.: WO99/54648
PCT Pub. Date: Oct. 28, 1999

(30) Foreign Application Priority Data

Apr. 17, 1998 (DE) .......................... 198 17 166

(51) Int. Cl.[7] ................................. G05G 7/00
(52) U.S. Cl. ................ 74/473.15; 74/473.3; 74/500.5; 74/523
(58) Field of Search .......... 74/473.15–473.3, 74/473.33, 473.34, 500.5, 502.5, 471 XY, 523

(56) References Cited

U.S. PATENT DOCUMENTS

| | | | | | |
|---|---|---|---|---|---|
| 2,648,229 A | * | 8/1953 | Lura | ........................... | 74/378 |
| 4,630,500 A | * | 12/1986 | Suzuki | .................. | 74/473.34 X |
| 4,669,329 A | * | 6/1987 | Suzuki | .................. | 74/473.34 X |
| 4,693,135 A | * | 9/1987 | LaRocca et al. | ...... | 74/473.34 X |
| 4,711,135 A | * | 12/1987 | Horiuchi et al. | ........... | 74/491 X |
| 4,817,968 A | * | 4/1989 | Fischle | ......................... | 277/226 |
| 4,879,922 A | * | 11/1989 | Suzuki | ........................ | 74/500.5 |
| 5,129,278 A | * | 7/1992 | Nakao | ................. | 74/471 XY X |
| 5,144,853 A | * | 9/1992 | Giudici | .................... | 74/473.34 |
| 5,287,743 A | * | 2/1994 | Doolittle et al. | ........ | 74/471 XY |
| 5,419,214 A | * | 5/1995 | Buhl et al. | ................. | 74/523 X |
| 5,560,253 A | | 10/1996 | Ishikawa Koichi et al. | | |
| 5,887,485 A | * | 3/1999 | VanOrder et al. | ......... | 74/473.15 |
| 5,896,778 A | * | 4/1999 | Murakami et al. | ........ | 74/473.34 |
| 5,934,146 A | * | 8/1999 | Richard | .................... | 74/473.33 |
| 6,006,623 A | * | 12/1999 | Sugiyama | ................. | 74/473.15 |

FOREIGN PATENT DOCUMENTS

| | | |
|---|---|---|
| EP | 0431307 A | 6/1991 |
| EP | 0864780 A | 9/1998 |

* cited by examiner

Primary Examiner—David A. Bucci
Assistant Examiner—Colby Hansen
(74) Attorney, Agent, or Firm—Renner, Otto, Boisselle & Sklar, LLP

(57) ABSTRACT

A shift-lever unit for converting tilting movements of a shift lever (30) into pulling movements of two cable lines (40, 70), comprising a housing unit (10) which defines two rotation axes (100, 200) perpendicular to one another, a frame unit (20) which is mounted on the housing unit (10) so as to be rotatable about the first rotation axis (100) and to which the first of the two cable lines (40) is fastened, a deflecting unit (60) which is mounted in a rotatable manner on the housing unit (10) parallel to the first rotation axis (100) but so as to be offset from the latter and to which the second of the two cable lines (70) is fastened, and a shift lever (30) which is mounted in said frame unit (20) so as to be rotatable about the second rotation axis (200) and which is operatively connected to the deflecting unit (60) in such a way that tilting of the shift lever (30) about the first rotation axis (100) essentially leads to a pulling movement on the first cable line (40), and tilting of the shift lever (30) about the second rotation axis (200) leads to a rotation of the deflecting unit (60) and thus essentially to a pulling movement on the second cable line (70).

17 Claims, 5 Drawing Sheets

GEARSHIFT LEVER UNIT

TECHNICAL FIELD

The present invention relates to a shift-lever unit, in particular for a motor vehicle, for transmitting movements of a shift lever to cable lines, in particular for controlling a vehicle transmission.

PRIOR ART

In a vehicle, the tilting movements of a shift lever are typically transmitted via cable lines (so-called push-pull cable) or a linkage to the transmission of the vehicle in order to change the gears. In this case, the shift lever is usually mounted so as to be rotatable about two axes perpendicular to one another in order to permit an independent tilting movement in two planes perpendicular to one another.

In conventional shift-lever units, the cable lines or the linkage are/is often fastened directly to the respective axis of the shift-lever mounting, so that a rotation about the axis is converted into a rotation of the transmitting cable or the linkage, which in turn transmits the rotary movement to the transmission. In this case, however, the following difficulties arise:

Cable lines, which on account of their simple assembly and low weight have many advantages for use in a vehicle, are primarily suitable for the transmission of pulling movements. However, the precise transmission of rotary or torsional movements, as are necessary in shift-lever units according to the prior art for controlling the transmission, imposes very high demands on the rigidity and fatigue strength of the wire cable used. On the other hand, excessive rigidity impairs the flexibility during the displacement of the cable line in the vehicle.

Although a linkage avoids the abovementioned problems, it requires substantially greater outlay and thus considerably higher costs, since the individual components such as rods, joints or bearings have to be additionally fitted between the shift-lever unit and the transmission and have to be dismantled in the event of a repair.

The problem underlying the present invention is therefore to provide a simple and inexpensive-to-produce shift-lever unit which converts tilting movements of the shift lever into linear movements in order to be able to use sufficiently flexible cable lines for the precise control of the transmission.

DESCRIPTION OF THE INVENTION

The invention relates to a shift-lever unit for converting tilting movements of a shift lever into pulling movements of two cable lines, comprising a housing unit which defines two rotation axes perpendicular to one another, a frame unit which is mounted on the housing unit so as to be rotatable about the first rotation axis and to which the first of the two cable lines is fastened, a deflecting unit which is mounted in a rotatable manner on the housing unit parallel to the first rotation axis but so as to be offset from the latter and to which the second of the two cable lines is fastened, and a shift lever which is mounted in said frame unit so as to be rotatable about the second rotation axis and which is operatively connected to the deflecting unit in such a way that tilting of the shift lever about the first rotation axis essentially leads to a pulling movement on the first cable line, and tilting of the shift lever about the second rotation axis leads to a rotation of the deflecting unit and thus essentially to a pulling movement on the second cable line.

The shift lever preferably comprises a projection and the deflecting element preferably comprises an opening in which the projection engages in order to rotate the deflecting element. In this case, the opening is preferably of rectangular design, and the projection acts in the opening of the deflecting element on a slide, which is mounted in a slidable manner and can slide in a reciprocating manner in the opening for compensation during rotation of the deflecting element.

The first cable line is preferably fastened to a slide, mounted in a slidable manner, in a rectangular recess of the frame unit, the slide being able to slide up and down during the tilting of the shift lever about the first axis for compensating for the up and down movement of the recess.

The second cable line is also preferably fastened to a slide, mounted in a slidable manner, in a rectangular recess of the deflecting element, the slide being able to slide up and down for compensating for the up and down movement of the recess.

BRIEF DESCRIPTION OF THE DRAWING

A currently preferred embodiment of the present invention is described below in detail with reference to the drawing, in which.

DETAILED DESCRIPTION OF THE INVENTION

Figure 1:
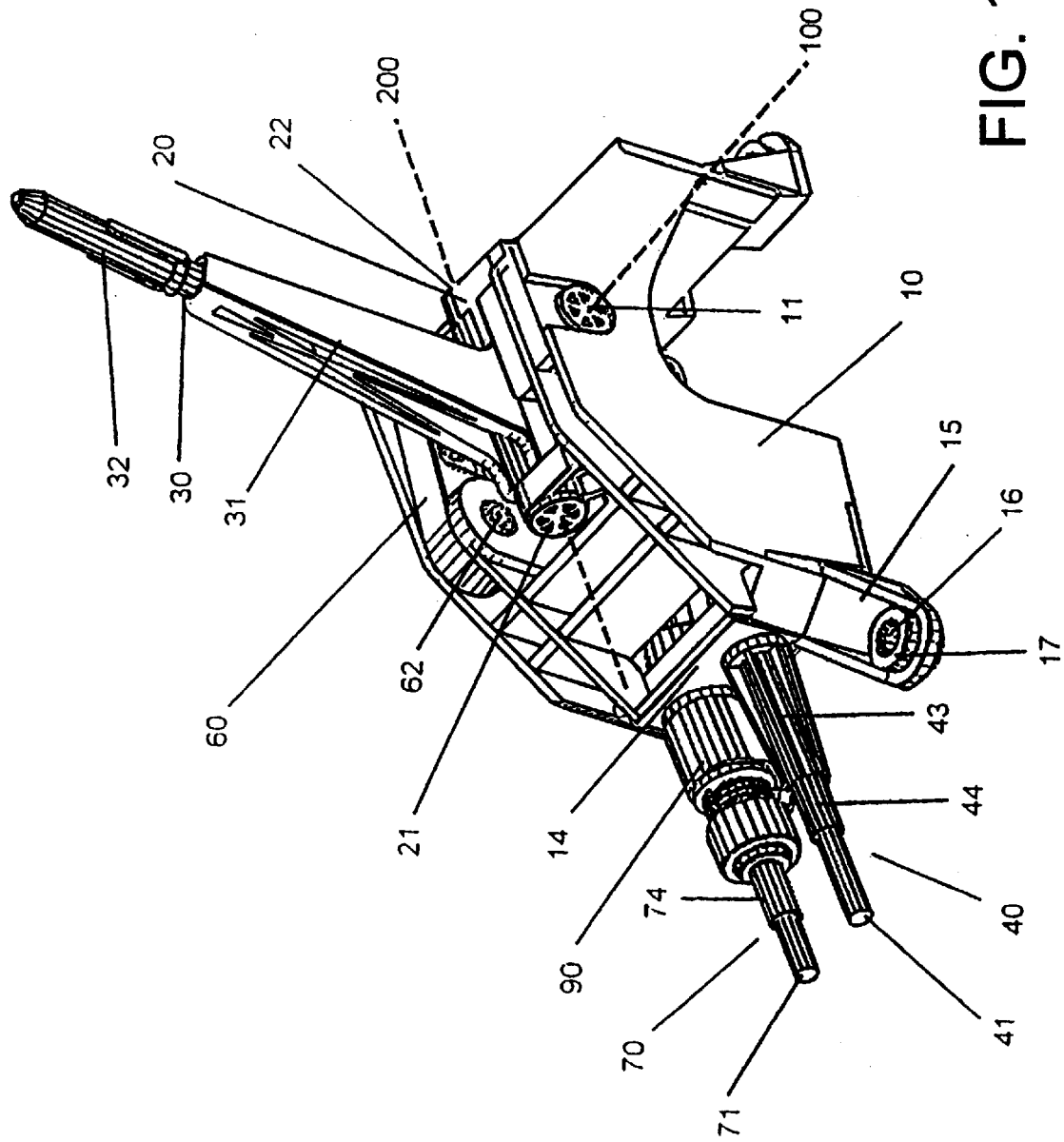
FIG. 1 shows a representation of the complete shift-lever unit.

With reference to FIG. 1, the shift-lever unit according to the invention has a housing unit 10 which is built in a sandwich type of construction with a plurality of transverse side walls and longitudinal side walls in order to obtain high stability. A frame unit 20 is mounted on one longitudinal side of the housing unit 10 in such a way as to be rotatable via a pivot pin 11. The direction of the pivot pin 11 perpendicular to the longitudinal side walls of the housing unit 10 defines a first rotation axis 100. In order to fasten the shift-lever unit to the vehicle, feet 15 with openings 16 in which eyes 17 are provided in order to increase the stability are provided on the housing 10.

A shift lever 30 is mounted in the frame unit so as to be rotatable via two pivot pins 21, 22. As a result, the two pivot pins 21, 22 define a second rotation axis 200, which is oriented perpendicularly to the first rotation axis 100. The inner wire cable 41 of the first cable line 40 is fastened to the underside of the frame unit, as described in more detail further below with reference to FIG. 2.

The shift lever 30 consists of a bottom part 31 and a top handle part 32, which in the fitted state projects from a sleeve (not shown) which covers the shift-lever unit. The shift lever 30 is preferably oriented vertically in its normal position and the frame unit 20 is therefore oriented horizontally. In order to meet the ergonomic requirements imposed on a shift lever, the shift lever 30 in this case is preferably inclined slightly forward.

On that longitudinal side of the housing unit 10 which is opposite the pivot pin 11, the deflecting element 60, to which the inner wire cable 71 of the second cable line 70 is fastened, is mounted between two parallel outer walls of the [lacuna] so as to be rotatable via a further pivot pin 62. The pivot pin 62 is thus arranged parallel to the first axis 100 but so as to be laterally offset from it. The mode of operation and the precise design of the deflecting element is explained in more detail further below with reference to FIG. 4.

At the rear end of the housing unit 10, the sheaths 44, 74 of the cable lines 40, 70 are fastened to the outermost transverse side wall 14. Shown by way of example in FIG. 1 for the second cable line 70 is an adjusting device 90 for setting the tension of the second cable line 70, whereas the sheath 44 of the first cable line 40 is connected to the transverse side wall 14 via a simple connection part 43. In this case, the inner wire cables 41, 71 are oriented in such a way that the imaginary continuation of the respective wire cable points exactly to the suspension point on the frame unit 20 or on the deflecting element 60. The construction of the adjusting device 90 and of the connection part 43 is explained in more detail further below with reference to FIG. 4.

In the preferred embodiment shown in FIG. 2, cylindrical projections 24, 25, to which a rubber ring 26 is fastened in each case, are attached in the bottom region of the frame unit 22 diagonally below the pivot pins 21, 22. These projections serve as stops on the transverse sides of the housing unit 10 for limiting the rotary movement of the frame unit 20 in the housing and thus the tilting movement of the shift lever 30 about the first rotation axis 100. The rubber rings 26 dampen the stop.

Figure 2:
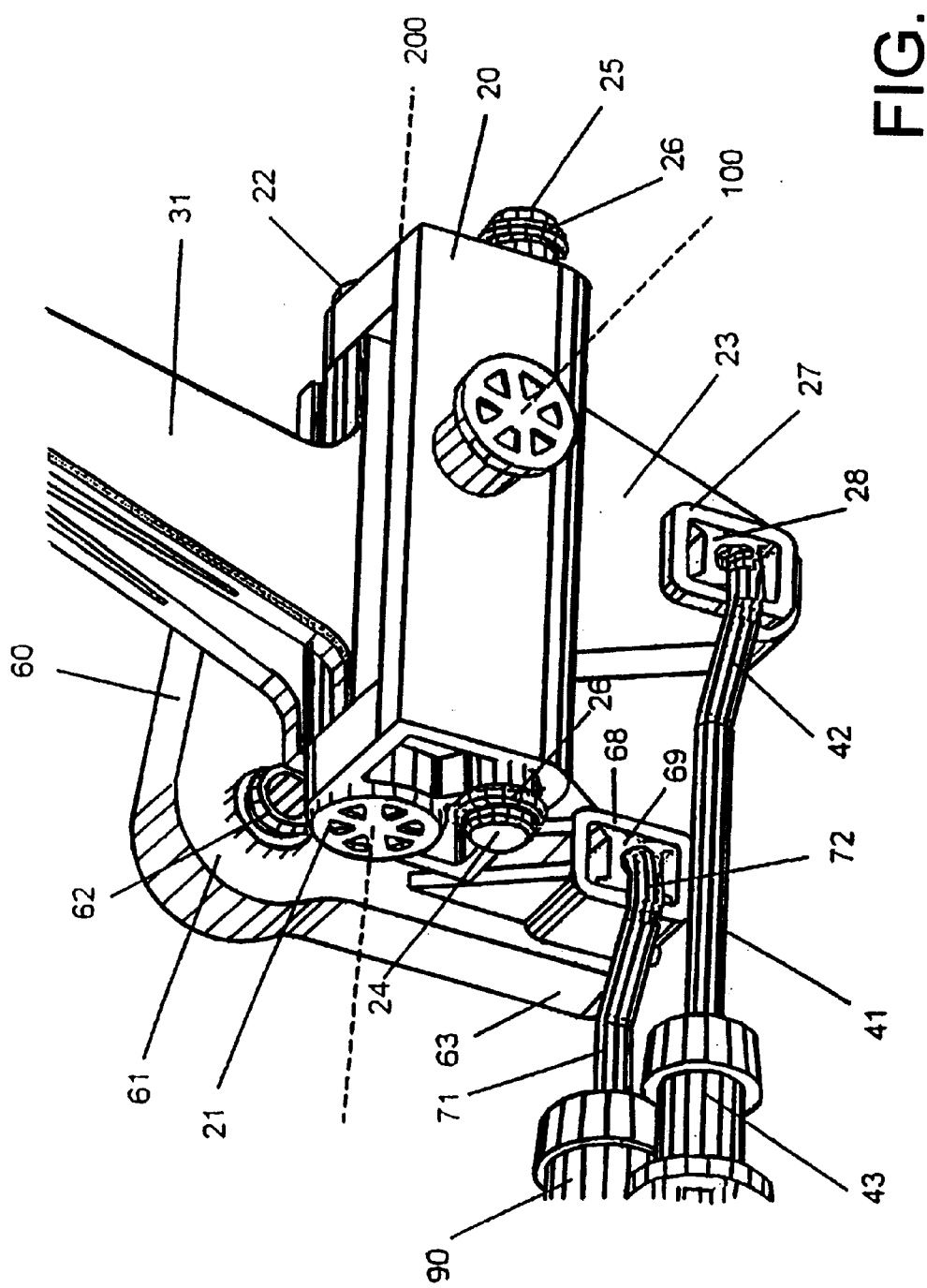
FIG. 2 shows a detail representation of the fastening of the two cable lines.

Furthermore, as also shown in FIG. 2, the frame unit 20 comprises an extension 23, which is designed as an essentially triangular strut. In another embodiment (not shown), this extension 23 is of half-round design in order to permit a more stable connection to the top part of the frame unit 20 during high pulling loads of the cable line 40.

During a tilting movement of the shift lever 30 and thus of the frame unit 20 about the first rotation axis 100, the fastening of the inner wire cable 41 of the first cable line 40 moves essentially in a reciprocating manner, i.e. in proportion to the sine of the tilting angle. As a result, the desired pulling movement according to the invention is transmitted to the first inner wire cable 41. At the same time, however, the fastening also moves slightly up and down, i.e. in proportion to the cosine of the tilting angle, and thus perpendicularly to the direction of the first cable line 40.

So that no distortions of the cable line 40 occur, the inner wire cable 41 of the first cable line is fastened in a rectangular recess 24 of the extension 23 of the frame unit 20 to a slide 28, which is mounted in a slidable manner and can slide up and down for compensation during the rotary movement of the frame unit 20 about the first rotation axis 100. In this case, the end of the inner wire cable 41 is formed into a hook 42, which is inserted into a small opening of the slide 28.

During a rotation of the deflecting element 60 about the pivot pin 62 (cf. FIG. 4), the fastening of the inner wire cable 71 of the second cable line 70 moves in a similar manner essentially in a reciprocating manner, i.e. in proportion to the sine of the rotary angle of the deflecting element 60. As a result, the desired pulling movement according to the invention is transmitted to the second inner wire cable 71. At the same time, however, the fastening moves slightly up and down, i.e. in proportion to the cosine of the rotary angle of the deflecting element 60, and thus perpendicularly to the direction of the second cable line 70.

So that no distortions of the second cable line 70 occur either, the inner wire cable 71 of the second cable line is fastened in a rectangular recess 68 of the deflecting element 60 to a slide 69, which is mounted in a slidable manner and can slide up and down for compensation during the rotary movement of the deflecting unit 60. In this case, the end of the inner wire cable 71 is formed into a hook 72, which is inserted into a small opening of the slide 69.

In a second, simpler embodiment (not shown) of the compensation mechanisms in the fastening of the inner wire cables 41, 71, in each case a perpendicular slotted hole is provided both in the extension 23 of the frame unit 20 and on the deflecting element, in which slotted hole the hook 42, 72 of the respective cable line can slide up and down.

Figure 3:
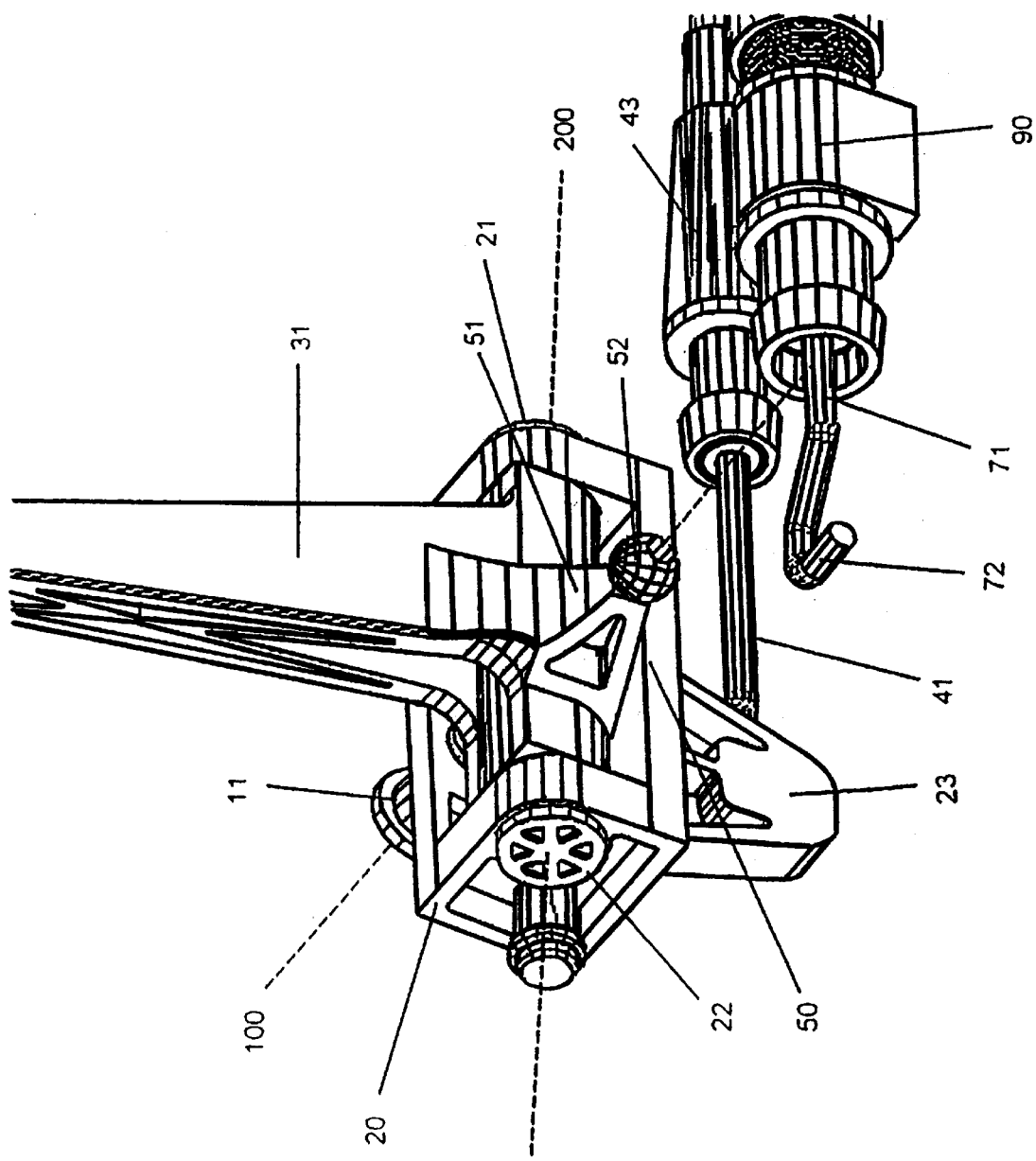
FIG. 3 shows a detail representation of the projection on the shift lever.
Figure 4:
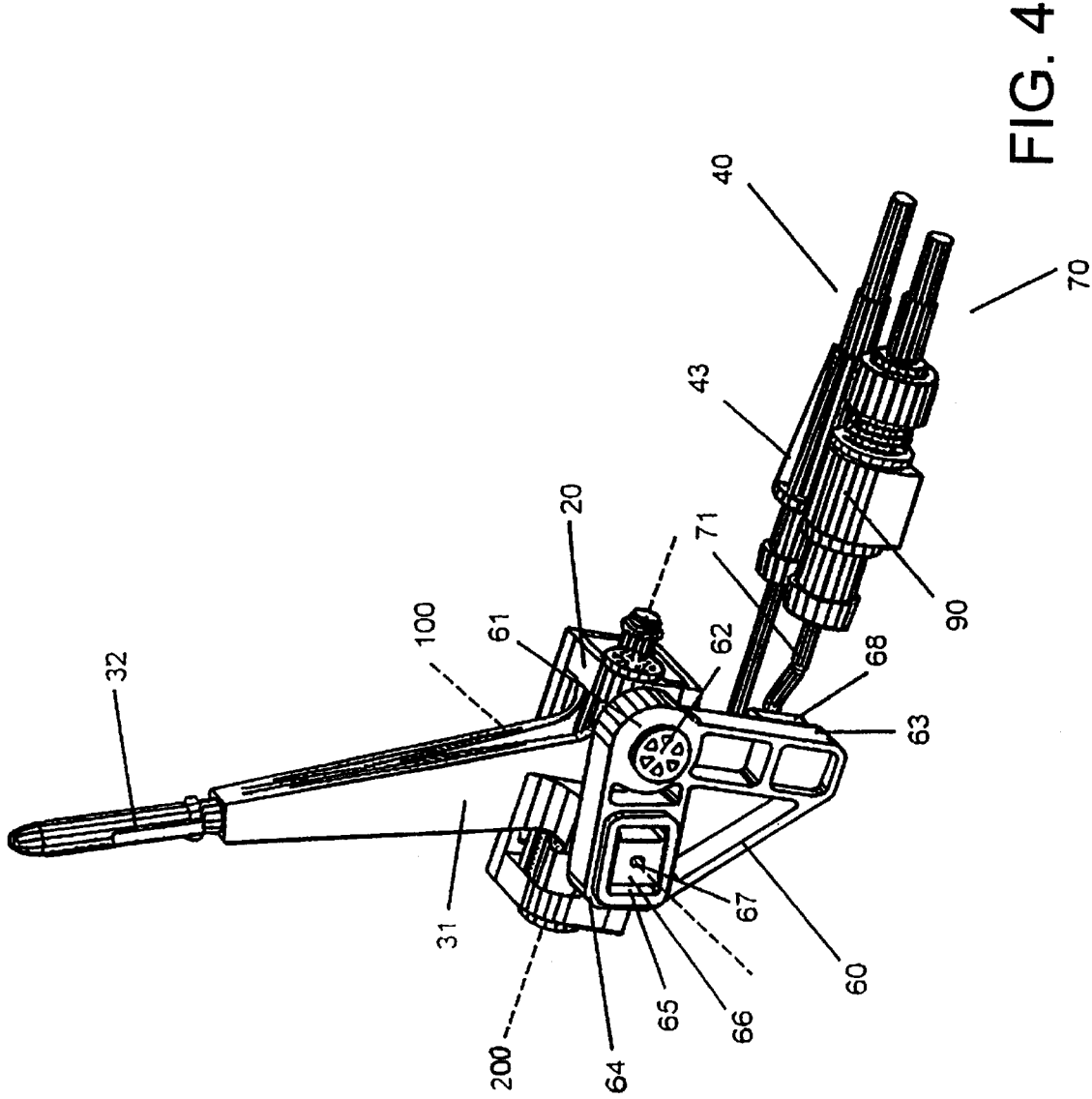
FIG. 4 shows a detail representation of the deflecting element.

With reference to FIG. 3, the shift lever 30, on the side which is remote from the pivot pin 11, has a projection 50 in the direction of the first rotation axis 100, and this projection 50 consists of a region 51 narrowing in a pyramid shape and a spherical end 52. If the shift lever 30 is tilted about the second rotation axis 200, the spherical end 52 of this projection 50 moves essentially up and down during small angular deflections. In the process, the spherical end 52 engages in the deflecting element 60, the task of which is to convert the up and down movement of the spherical end 52 into a reciprocating movement parallel to the direction of the cable lines 40, 70. To this end, the deflecting element 60 is of preferably triangular design, as can be seen in FIG. 4. In a corner 61, the deflecting element 60 is mounted on the housing unit 10 so as to be rotatable via the pivot pin 62. The inner wire cable 71 of the second cable line 70 is fastened in a second corner 63, which projects downward in the normal position. In a third corner 64, the deflecting element 60 contains an opening 65, in which the projection 50 engages in order to rotate the deflecting element 60.

A rotation of the deflecting element 60 about the pivot pin 62 leads to the opening 65 moving on a circular path about the pivot pin 62. As a result, it is rotated out of the plane in which the projection 50 of the shift lever 30 moves during a tilting movement about the second rotation axis 200. For compensation, the opening 65 is of rectangular design. In the preferred embodiment shown in FIG. 4, the projection 50 acts in the rectangular opening 65 of the deflecting element 60 on a slide 66, which is mounted in a slidable manner and can slide in a reciprocating manner in the opening 65 and as a result can remain in the motion plane of the projection 50 of the shift lever 30 during a rotation of the deflecting element 60. So that the projection 50 can rotate the deflecting element 60, the slide 66 has a small round opening 67 in the center, in which opening 67 the spherical end 52 of the projection 50 engages.

In a second, simpler embodiment (not shown) of the present invention, the projection 50 on the shift lever 30 consists of a round rod, the end of which slides in a simple slotted hole of the deflecting element, this slotted hole being horizontal in the initial position. In this embodiment, too, the elongated shape of the opening compensates for the rotation out of the motion plane of the projection 50.

Figure 5:
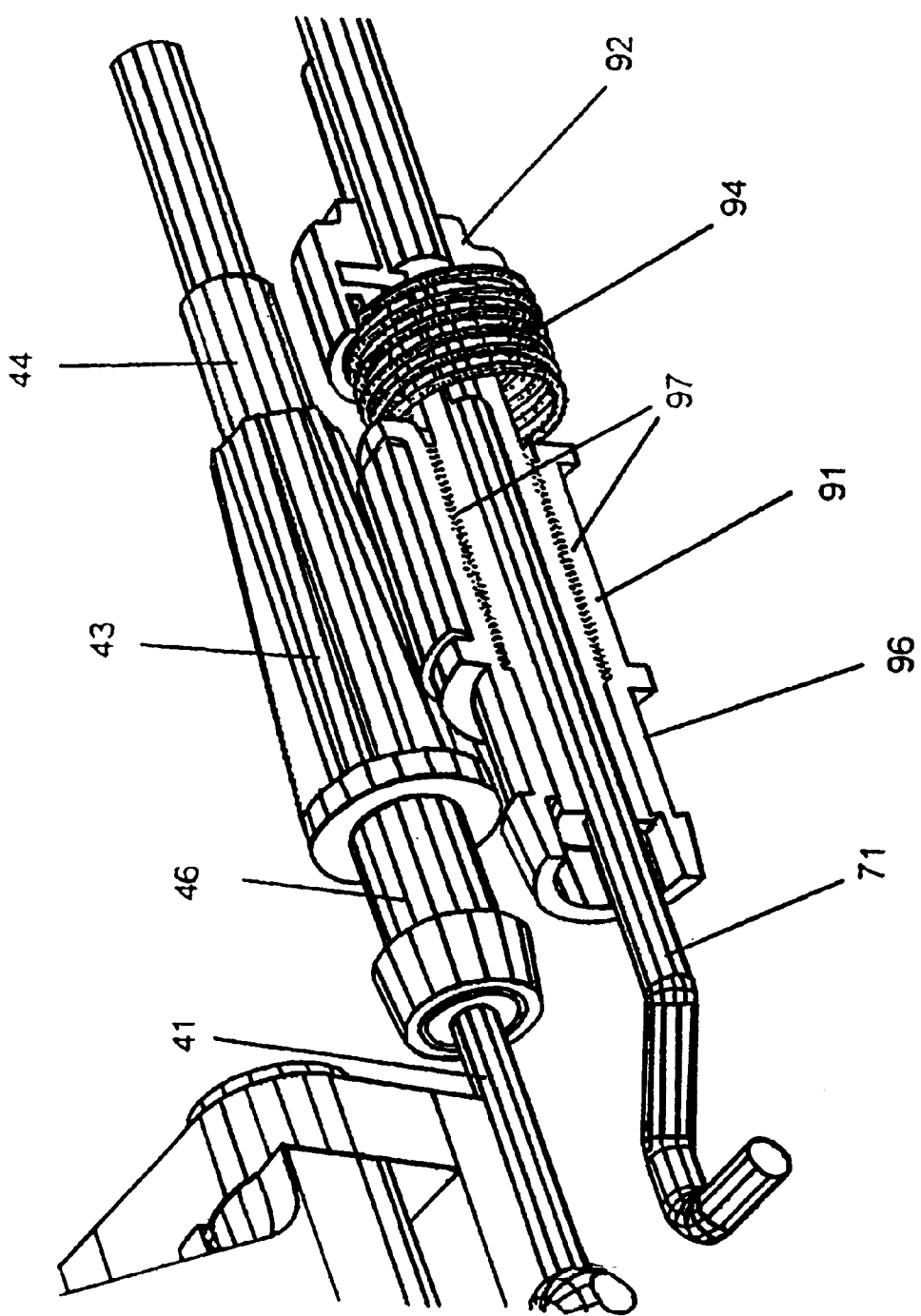
FIG. 5 shows a detail representation of the adjusting device of the cable lines and the fastening of the sheaths to the housing.

FIG. 5 shows a detailed representation of the adjusting device 90 and of the connection part 43. The adjusting device consists of two sheath parts 91, 92, which are telescoped in order to vary the length of the sheath 72 and thus the tension on the inner wire cable 71. In order to prevent an unintentional displacement of the two sheath parts 91, 92 relative to each other, tooth systems 97, which engage one inside the other, are provided on both sheath parts over a part of the circumference of the two sheath parts 91, 92. If the adjustment is to be changed, the two sheath parts are rotated by 90° relative to one another in order to release the tooth systems from one another, so that the sheath parts 91, 92 can be displaced relative to one another. To compensate for the pulling load on the cable line during the adjustment, a spiral spring 94 is provided between the two sheath parts.

The sheath part 91 with which the cable line 70 is fastened to the rear transverse side of the housing unit 10 has a region 96 of smaller diameter, which for fastening is inserted into an opening of corresponding diameter in the rear transverse side 14 of the housing unit.

If an adjusting device 90 is dispensed with, a sheath part 43 having a region of smaller diameter 46 which corresponds to the region 96 in its function forms the fastening of the sheath 44 of the cable line to the housing unit 10.

For inexpensive production of the shift-lever unit, the components of the shift-lever unit which have been described are preferably produced by injection molding from plastic, in particular from polyamide. Only the eyes 17 for strengthening the fastening of the shift-lever unit to the chassis of the vehicle are preferably made of metal.

What is claimed is:

1. Shift-lever unit for converting tilting movements of a shift lever into pulling movements of two cable lines, comprising a housing unit which defines two rotation axes perpendicular to one another;

a frame unit which is mounted on the housing unit so as to be rotatable about the first rotation axis and to which the first of two cable lines is fastened;

a deflecting unit which is mounted in a rotatable manner on the housing unit parallel to the first rotation axis but so as to be offset from the latter and to which the second of the two cable lines is fastened; and a shift lever which is mounted in said frame unit so as to be rotatable about the second rotation axis and which is operatively connected to the deflecting unit in such a way that tilting of the shift lever about the first rotation axis essentially leads to a pulling movement on the first cable line, and tilting of the shift lever about the second rotation axis leads to a rotation of the deflecting unit and thus essentially to a pulling movement on the second cable line;

the first cable line having an inner wire cable, which is fastened to a slide, mounted in a slidable manner, and the slide being able to slide up and down during tilting of the shift lever about the first rotation axis for compensating for the up and down movement of the recess.

2. Shift-lever unit according to claim 1, the shift lever comprising a projection and the deflecting element comprising an opening in which the projection engages in order to rotate the deflecting element.

3. Shift-lever unit according to claim 2, the opening being rectangular design, and the projection acting in the opening of the deflecting element of the slide, which is mounted in a slidable manner and can slide in a reciprocating manner in the opening for compensation during rotation of the deflecting element.

4. Shift-lever unit according to claim 3, the projection consisting of a narrowing region, which ends in a spherical region.

5. Shift-lever unit according to claim 4, the slide in the rectangular opening of the deflecting element having a small round opening in the center, in which opening the spherical region of the projection engages.

6. Shift-lever unit according to claim 1, the deflecting element being of essentially triangular design and being fastened in a rotatable manner at its first corner, and the projection of the shift lever acting on its third corner.

7. Shift-lever unit according to claim 1, feet having holes being provided on the housing unit in order to fasten the shift-lever unit to the vehicle chassis.

8. Shift-lever unit according to claim 7, metallic eyes being provided in the holes of the feet in order to increase the stability of the fastening to the vehicle chassis.

9. Shift-lever unit according to claim 1, an adjusting device being attached to the end of at least one of the cable lines in order to adjust the tension of at least one cable line.

10. Shift-lever unit according to claim 1, the shift lever and the second rotation axis enclosing an angle <90°.

11. Shift-lever unit according to claim 1, projections being attached as stops to the frame unit, which projections limit the rotary movement of the frame unit.

12. Shift-lever unit for converting tilting movements of a shift lever into pulling movements of two cable lines, comprising a housing unit which defines two rotation axes perpendicular to one another;

a frame unit which is mounted on the housing unit so as to be rotatable about the first rotation axis and to which the first of two cable lines is fastened;

a deflecting unit which is mounted in a rotatable manner on the housing unit parallel to the first rotation axis but so as to be offset from the latter and to which the second of the two cable lines is fastened; and a shift lever which is mounted in said frame unit so as to be rotatable about the second rotation axis and which is operatively connected to the deflecting unit in such a way that tilting of the shift lever about the first rotation axis essentially leads to a pulling movement on the first cable line, and tilting of the shift lever about the second rotation axis leads to a rotation of the deflecting unit and thus essentially to a pulling movement on the second cable line;

the deflecting element being of essentially triangular design and being fastened in a rotatable manner at its first corner to the housing unit, the second cable line being fastened at its second corner, and a projection of the shaft lever acting on its third corner; and the second cable line having an inner wire cable, which is fastened to a slide, mounted in a slidable manner, in a rectangular recess of the second corner of the deflecting element, and the slide being able to slide up and down for compensating for the up and down movement of the recess.

13. Shift-lever unit according to claim 12, feet having holes being provided on the housing unit in order to fasten the shift-lever unit to the vehicle chassis.

14. Shift-lever unit according to claim 13, metallic eyes being provided in the holes of the feet in order to increase the stability of the fastening to the vehicle chassis.

15. Shift-lever unit according to claim 12, an adjusting device being attached to the end of at least one of the cable lines in order to adjust the tension of at least one cable line.

16. Shift-lever unit according to claim 12, the shift lever and the second rotation axis enclosing an angle <90°.

17. Shift-lever unit according to claim 12, projections being attached as stops to the frame unit, which projections limit the rotary movement of the frame unit.

* * * * *